United States Patent Office 2,897,867
Patented Aug. 4, 1959

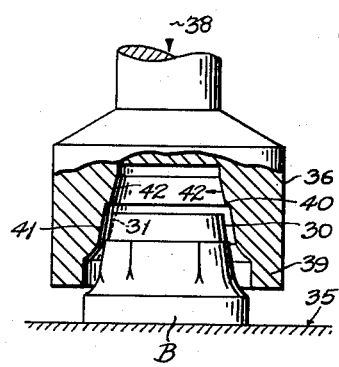
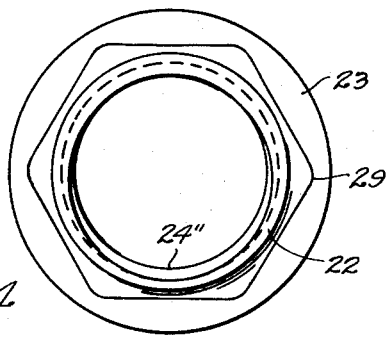
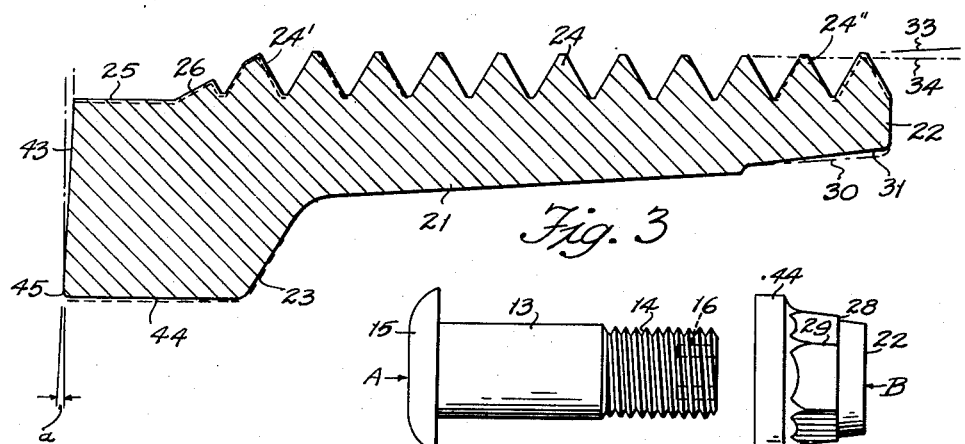
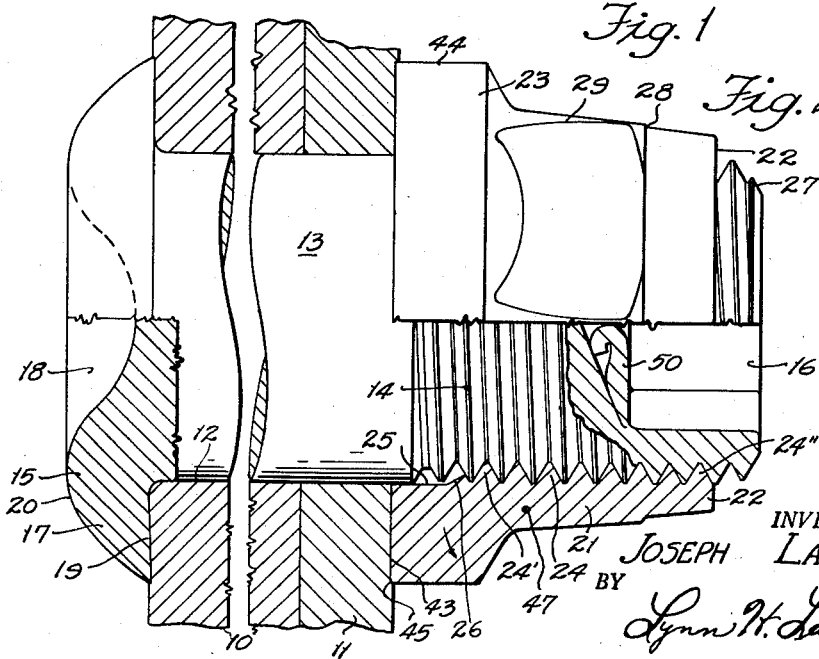

2,897,867

LOCK NUT HAVING PIVOTING CONCAVE BEARING END AND INWARDLY DEFORMED TIP TO EFFECTUATE UNIFORMLY STRESSED THREADS

Joseph La Torre, Torrance, Calif.

Application May 6, 1957, Serial No. 657,373

6 Claims. (Cl. 151—21)

This invention relates to nut and bolt fasteners and has as its general object to provide an improved combination of bolt and nut having greatly improved characteristics of (a) driving operation by a power or hand driving tool, in which the nut is driven onto the bolt while the latter is held by the tool at the end to which the nut is applied, (b) shear-failure resistance in the thread of the nut, (c) with resulting increase in tension load bearing capacity, (d) locking of the nut to the bolt thread with increased locking effectiveness, and (e) separation and recoupling of the nut and bolt without impairing the thread structure or the locking efficiency of the thread lock.

Another object is to provide a nut having the above mentioned improved characteristics in combination with lightness in weight. The requirement for fasteners in modern industry, particularly in the aircraft industry, have become increasingly severe in demanding high loading capacity combined with lightness in weight. In this respect, the invention contemplates a lightweight fastener in which the nut may be of an aluminum alloy, extremely light in weight and yet having a greatly improved resistance to shear failure in its threads. In attaining this result, the invention aims to provide a fastener wherein the cooperative action between the nut and bolt in response to high tension loading produces a greatly improved distribution of shear loading between the several turns of the female thread of the nut, with the net result that the tension loading capacity of the fastener is increased as much as fifteen percent to twenty percent over fasteners of comparable dimensions and materials. In this respect, the invention deals particularly with a factor which I have found to be a major cause of shear failure in nut threads, namely the fact that the bolt, under high tension loads, will elongate so as to increase the pitch of its thread, thus causing a concentration of the tension load in the first one or two turns of the nut thread. This condition is corrected in the present invention by the utilization of means in the nut which reacts to the tension load to slightly expand the lead threads of the nut so as to allow the corresponding thread turns of the bolt to advance slightly (due to the releasing action of the sloping sides of the V-section threads which are utilized in the nut and bolt). Thus the concentration of loading in the lead threads of the nut is partially relieved and a portion of the load is transferred to the higher (intermediate) threads of the nut.

A further object is to provide a fastener wherein the above mentioned expansion of the lead threads of the nut under loading is related to the amount of elongation of the bolt under the same loading, so that there is a substantially uniform distribution of shear loading throughout all of the turns of the nut thread.

The invention has as a further object to provide such a fastener having an all metal thread lock which operates within the elastic limit of the fastener parts to the extent that the nut and bolt may be separated and recoupled a large number of times without impairing the locking efficiency thereof and without damaging the surfaces of the threads of the fastener.

Other objects and advantages will become apparent in the ensuing specification and appended drawings in which:

Fig. 1 is an exploded view of a fastener comprising nut and bolt parts embodying the invention;

Fig. 2 is a fragmentary view of the same on an enlarged scale, shown partially in elevation and partly in axial section, and showing the fastener mounted in a pair of work sheets that are secured together thereby;

Fig. 3 is a fragmentary axial sectional view of the nut in its unstressed state, on a further enlarged scale;

Fig. 4 is an end view of the nut; and

Fig. 5 is a sectional view illustrating the processing of the nut to provide the thread locking constriction in the locking collar of the nut.

Referring now to the drawings in detail, I have shown therein, as an example of one form in which the invention may be embodied, a fastener comprising a bolt A and a nut B cooperate with the bolt A to develop a fastened assembly including plate or sheet members 10 and 11 as shown in Fig. 2, having cylindrical openings 12 therein to receive the fastener.

The bolt A includes a cylindrical shank 13 which has a diameter the same as the opening 12 in the work (or very slightly larger) so as to provide for a tight interference fit of the bolt shank in the work. The bolt further includes a threaded section 14 constituting an integral extension of cylindrical shank 13 at one end of the bolt, and a diaphragm head 15 integral with the other end of shank 13. Threaded section 14 has a male V-section thread the outer diameter of which is slightly less than the diameter of cylindrical shank 13, so that the threaded section 14 may be inserted freely through the work opening 12 without dragging the thread against the opening. Threaded section 14 has a tip which is provided with means for wrenching coaction with one part of a driving tool while another part of the same tool simultaneously engages the nut B to effect relative rotation of the bolt and nut to couple them together from one side of the work. The wrenching means of the tip of threaded section 14 is shown as constituting a hexagonal socket 16 in the end of the threaded section, although it will be understood that equivalent wrenching means could be substituted, such as a socket of different cross sectional configuration or a breakoff tip having external wrenching surfaces for reception in a socket in a driving tool.

The head 15 is constructed for maximum shear strength combined with minimum weight. It embodies a radial flange portion 17 of convex curvature in cross section, sloping gradually to substantially zero thickness at the periphery thereof and having maximum axial thickness at a radius corresponding substantially to the radius of shank 13, to provide maximum resistance to shearing action of the edge of the work defining the outer margin of hole 12. The head 15 further includes a central portion, within the diameter of shank 13 and constituting an integral extension thereof, in which there is provided a central dished recess 18 having a surface that is of double curvature, including a concave central portion and a convex outer portion which continues the convex curvature of the flange part 17 of the head. The convex and concave surfaces are tangent to one another, whereby the axial section of the head shows the form of the letter S. The bottom of recess 18 is spaced slightly outwardly of the plane of a work-engaging shoulder 19 which is defined as the underface of flange part 17, or may be substantially tangent to said plane.

The work engaging face 19 is undercut and frusto-conical, subtending an angle of approximately within the range of one to four degrees to a plane normal to the axis of shank 13, an optimum angle being approximately two degrees.

The head 15 is annular and of uniform radial cross sectional configuration throughout its circumference.

The shoulder 19 intersects the concave outer face of the flange part 17 to define an edge which provides initial bearing contact with the work. As tension loads are imposed on the bolt, the flange part 17 is deflected with a Belleville washer type of deflection in which the shoulder 19 is flattened until it establishes full bearing contact with the adjacent work sheet 10, in substantially a flat plane (deivating therefrom slightly by indentation of the work by the outer part of the shoulder 19 as indicated in Fig. 2). In such Belleville washer deflection, the crown portion 20 of the head, at the radius of maximum thickness thereof, is placed under compression, increasing the resistance of the head to the shearing action at that radius. At the same time, the bending stresses set up in flange part 17 provide for distribution of the load throughout the area of this flange part, thus further increasing the resistance to the shearing action. Also, since the flange part 17 has flexed with the diaphragm action, any tendency of the fastener to loosen or the bolt to elongate through temperature changes etc., will be compensated for by a return of flange 17 toward its initial unstressed configuration, thereby maintaining the tension loading of the head against the work regardless of slight axial elongation in the fastener. The uniform distribution of the load from head 15 to the work 12 makes it possible to utilize the fastener in joining sheets or plates of work material of lower compressive strength, without undue indenting of the work by the head, than would otherwise be possible.

The nut B includes a tubular intermediate body portion 21, a locking collar 22 at one end thereof (constituting the tip of the nut) a work engaging flange 23 at the other end of the nut, and an internal thread 24 which defines a threaded bore extending through the collar 22 and the tubular body portion 21 and into the flange 23. The first two turns of thread 24, adjacent the flange 23, which will be referred to as the lead turns of the thread, are indicated at 24'. The last two or three turns, within collar 22, will be referred to as a locking thread or the locking portion of the thread 24 and are indicated by the numeral 24". The thread 24 is a V-section thread, of the same pitch and cross sectional configuration as bolt thread 14 so as to closely mate therewith. It is of uniform pitch throughout the normal portion of the thread and the locking portion 24" subject only to a slight inward tilting of the locking turns 24" as will hereinafter be more fully described.

Flange 23 is provided with a cylindrical counterbore 25 of slightly larger diameter than the diameter of shank 13 so as to freely receive the shank as indicated in Fig. 2. Correspondingly, the diameter of counterbore 25 is somewhat larger than the major diameter of thread 24. Between the counterbore 25 and the lead turns 24' of the thread, the interior of the nut is countersunk or chamfered to provide a frusto-conical throat 26 adapted to coact with a frusto-conical chamfer 27 on the tip of the threaded section 14 of the bolt, to pilot the tip of the bolt into the lead thread 24' of the nut.

Locking portion 24" of the nut thread is characterized by a slight reduction in diameter below the diameter of the normal portion of thread 24, such as to provide for an interference fit between the male thread 14 of the bolt and the locking turns 24", for locking the nut to the bolt. The reduction in diameter in the locking thread is progressively greater beginning with the base of the locking collar 22 (at a shoulder 28 defining said base) and extending toward the end of the nut, maximum reduction in diameter occurring in the end turn of locking thread 24". This is illustrated in Fig. 3, the collar 22 being deformed inwardly uniformly throughout its circumference from an original frusto-conical contour indicated at 30 to a final frusto-conical external surface 31 subtending a somewhat greater cone angle than the original surface 30. Correspondingly, the inner edge of the locking turns 24" of the thread is permanently constricted to a progressively smaller diameter toward the end of the nut, so as to define a frusto-conical surface indicated by line 33, diverging inwardly from the cylindrical surface (indicated by line 34) defined by the inner edge of the normal portion of thread 24 (and by the inner edge of the locking thread 24" previous to being deformed inwardly).

An important characteristic of locking thread 24" is the substantial restriction of its deformation to radially inward displacement of the collar 22, avoiding axial compression of thread 24" as fully as can possibly be attained in the working of the collar by a suitable method such as is illustrated in Fig. 5. The deformation is accomplished by subjecting the nut B, suitably supported on an anvil surface 35, to a coining or swaging operation in which its collar portion 22, originally machined or forged to have the original frusto-conical surface 30 shown in full lines in Fig. 5, is permanently deformed inwardly to the permanent frusto-conical configuration 31, having the greater coning angle indicated in dotted lines in Fig. 5, through the action of a coining die 36 having a female coining face 37 of frusto-conical configuration corresponding to the permanent contour 31 (with due allowances for spring back in the collar after removal of the die). In the coining operation, the die 36, having first been aligned axially with the nut B, is moved along the common axis of the two toward the nut B as indicated by arrow 38, until the coining face 37 makes contact with the outer surface of collar 22. Under high pressure, the die is then moved against the nut to a limit position (which may be determined by engagement of a skirt portion 39 of the die against the anvil surface 35), the lead shoulder 40 between coining face 37 and the larger cavity 41 of the die operating with an ironing action against the outer surface of collar 22 to press the metal of the collar radially inwardly as indicated by arrows 42 of Fig. 5, until the die is fully closed on the nut. The coining face 37, having a greater cone angle than the original surface 30 of the collar 22, compresses the collar 22 uniformly around its circumference, tilting its outer end inwardly toward the axis of the nut, and correspondingly tilting the locking turns 24" of the collar inwardly from their original configuration (produced in a tapping operation) shown in dotted lines in Fig. 3, to their permanent configuration shown in full lines in Fig. 3. As a result, the locking thread 24" becomes a spirally helical thread, spiralling inwardly toward the end of the nut, and particularly characterized by a uniform and very gentle inward spiralling in which its diameter is very gradually but iniformly reduced from the base of the collar 22 to the end of the nut. The advantage of this construction is derived from the fact that as the threaded section 14 of the bolt is threaded into and through the collar 22, it exerts a gradual expanding action on the collar, beginning with a very gentle outward pressure exerted at the beginning of the locking thread 24" at the base of collar 22 and gradually increasing as the more constriction portions of the locking thread 24" are encountered. The expanding force generated at the beginning part of the locking thread, however, continues to be exerted, tending to expand the collar 22, and is added to the expanding force applied to the further turns of the locking thread as the bolt progresses through the collar. Thus the spreading force is distributed with maximum uniformity throughout the entire inner surface of the collar 22, avoiding a high concentration of expanding force at any particular point along the axial path of advance of the bolt or along the circumferential path of rotation of the male thread within the locking thread 24". The net result is that the collar 22 is expanded smoothly throughout its entire area, well within its elastic limit, with an avoidance of any localized points of extremely high pressure between the threads such as is encountered where locking is effected by engagement of small local areas of thread deformation of one thread against the other thread in other types of locking nut and bolt combinations. In the fastener of my invention, the locking function is derived from the constricting engagement of the nut thread against the bolt thread, uniformly around the circumference of the fastener, under the hoop tension that is developed in the collar 22 from the expansion thereof by the bolt, and with an absence of any indenting or galling effect of a localized indentation in one thread or parts of threads against the mating thread. Consequently, it is possible to remove the nut from the bolt a large number of times and to recouple the parts of the fastener without any damage to the threads arising from galling or excessive wear or any permanent deformation of the locking thread back toward its original configuration attained in a tapping or thread forming operation preceding the coining operation of Fig. 5. A further advantage resides in the fact that the nut and bolt can be coupled without the necessity for applying excessive torque.

By avoiding any reduction in pitch in the locking thread as far as possible in the coining operation, and thus maintaining the locking thread of substantially uniform pitch with the normal portion of the thread 24, the invention reduces to a minimum the tension loading of the locking thread. I find that the loading of the locking thread arising from the forced expansion of the collar 22 constitutes substantially the maximum loading that should be imposed upon the locking thread. Furthermore, it is an important object of the invention to distribute the shear loading between the various turns of the normal portion of the thread 24, and to avoid the unloading of the last several turns of the normal portion of the thread adjacent the locking thread 24". This is accomplished by maintaining uniformity of pitch between the normal turns and the locking turns of the thread.

Distribution of shear loading through all of the normal turns of the thread 24 is accomplished by the following means: flange 23 has a frusto-conical work engaging seat 43 subtending an angle to a plane normal to the nut aixs which is quite small, within a range of 0.5 degree minimum and 3 degrees maximum, an optimum being 1 to 2 degrees. The seat 43 intersects a cylindrical periphery 44 of flange 23 to define a leading edge 45 which makes initial contact with the work. As the fastener is loaded under tension, the resulting compression loads developed between flange 23 and the work element 11 cause the flange 23 to undergo a Belleville type of deflection in which the seat 43 is flattened into full contact with the work 11, in substantially a flat plane (modified by a slight indenting of the work with maximum indentation in the outer area where compression is the highest, as indicated in Fig. 2).

As the result of such Belleville deflection of the flange 23, the lead threads 24' of the nut will be slightly expanded in diameter, while the intermediate normal portion of thread 24 will be slightly contracted in diameter. This results from the fact that the Belleville deflection is characterized by a tilting of the cross section of the flange 23 around an annular axis in the nut in an area approximately indicated by the center mark 47 in Fig. 2, the flange 23 expanding and the outer end portion of the nut contracting as indicated by the arrows on either side of the axis 47.

The net effect of this expansion of the lead threads 24' and contraction of the intermediate normal turns of the thread 24 is related to the factor of elongation which takes place in the bolt as high tension loads are developed therein. The threaded section 14 being the weaker portion of the bolt, undergoes the maximum elongation, with the result that the pitch of its thread is slightly increased. In connection with a conventional nut, this would result in concentration of the shear loading of the nut threads in the leading turns 24' thereof (the corresponding bolt thread turns yielding toward these mating turns of the nut). The net effect of such elongation factor in the combination of a bolt with a nut not having the Belleville seat 43 would be to unload the intermediate turns of the nut thread and to highly load the lead turns. In the fastener of my invention, this unloading of the intermediate turns of the thread is counteracted by the inward contraction of these intermediate turns increasing the shear loading at the intermediate areas due to the camming effect of the sloping sides faces of the mating threads in effect counteracting the hoop tension normally developed. Correspondingly, the tendency toward overloading the lead thread 24' is counteracted by the expansion of these turns which provides additional clearance between the mating threads in this area due to the slope of their side faces.

The overall result is a substantially uniform distribution of shear loading between the normal turns of the thread including the lead turns thereof and the intermediate turns and the locking turns 24'. This is attained where the angle of work engaging seat 43 is within the range stated above. Where the seat is flatter than the range specified, there is insufficient Belleville flexure in the nut to effect a satisfactory transfer of loading. Where the angle $a$ is greater than the range specified, the combination is unsatisfactory for a number of reasons, including an excessive distortion of the nut which fails to attain the proper distribution of loading between the thread turns, and furthermore, including an excessive indenting of the work surface by the leading edge 45 of the flange 23.

The final result of this arrangement is an increase to as much as 15% to 20% in the tension load that will be taken by the nut without approaching the failure zone in which the thread will be stripped from the inside of the nut. I find, in actual tests, that overloading of the parts can result in stirring the entire thread out of the bore of a nut, leaving a cylindrical bore and detaching the thread from the nut in the form of a coil spring. In the conventional nut and bolt combination, as high loads are applied, all of the yielding takes place initially in the overloaded lead thread of the nut, which becomes deformed beyond its elastic limit, transferring substantially the full load to the next thread which likewise becomes overloaded, and the net result is that the nut thread fails at a much lower loading than in the case of the nut of my invention, wherein the overloading of the lead threads is relieved before they reach the yield point and is transferred to the intermediate threads at an earlier stage of loading.

As another important final result, the invention makes it possible to provide a nut with lower height (fewer threads) capable of carrying the same ultimate load as a conventional nut of greater height and additional threads.

A further advantageous end result is, that for a given high working load, which the nut of this invention can assume without any permanent thread deformation, the nut can be removed and will return to its exact original configuration so as to be reusable with full initial effectiveness, whereas the conventional nut, under such high loading, with its lead threads having been permanently yielded, cannot return to its initial configuration and would gall the bolt thread if applied a second time.

The locking turns 24" of the nut, where the normal clearances between the nut and bolt threads have been eliminated, will be constantly in full intimate contact with the bolt thread from the point where the outermost bolt thread first enters the locking area to a point where the nut is tightened against the work, and thus in the finally coupled condition, all threads of the nut are snugly seated against the bolt threads, with maximum uniformity of distribution of loading.

In the conventional fastener, the concentration of loading in the zone of the one or two lead threads of the nut, presents a concentrated strain on the bolt which tends to cause the bolt to fail at its corresponding thread mating with such lead threads, since all subsequent threads of the bolt will carry a progressively smaller portion of the load.

The tubular intermediate portion 21 of the nut is provided with wrenching projections 29 which may constitute the corner portions of a hexagonal periphery of the nut, for coaction with the socket member of the driving tool. This hexagonal periphery is of frusto-pyramidal configuration, with the smaller end thereof adjacent collar 22 so as to effect a piloting action of the nut in the driving socket. Equivalent alternative configurations (e. g. fewer or more sides, such as square or octagonal cross section) can be employed, or the projections 29 could be axially extending lugs, independent of a polygonal cross section.

In the process of forming the nut, it is first forged or machined to the configuration shown in full lines in Fig. 5, is then bored and threaded with the thread 24 of uniform radius and pitch from end to end, and is then finally subjected to the coining operation shown in Fig. 5 wherein the collar 22 is deformed inwardly.

In the processing of the bolt, it is first forged, as by cold heading; the tip of the bolt is then bored to provide a recess for the forming of socket 16, and the socket 16 is then formed by a one-stroke broaching operation in which slivers 50 of metal are sliced from the side wall of the bore, are pushed downwardly into the bottom of the bore, and are flattened against the bottom, filling the same to provide a flat bottom as indicated in Fig. 2. Alternatively, the socket may be formed in the forging operation.

The tip of the bolt is characterized by the fact that the socket 16 extends only to the depth of a few of the tip threads, and is terminated short of the threads which become highly loaded by engagement with the normal turns of threads 24 of the nut. Thus the more highly loaded bolt threads are internally supported by a solid core portion of the bolt, and the relatively unsupported outer turns of the bolt tip are the more lightly loaded turns of the thread.

The bolt shank is a few 10,000ths of an inch larger in diameter than the outer diameter of the thread 24, which in turn is a bare clearance fit in the work opening 12. The latter may actually be slightly smaller than the diameter of shank 13 so as to provide an interference fit or a snug metal to metal contact when the bolt is inserted into the work (e. g. by driving it in from the rear side of the work). The bolt as thus driven through the work, with its head in contact with the rear face thereof, is securely held against rotation when the nut is engaged. Thus it becomes possible to couple the nut to the bolt with a driving tool which engages the nut and establishes driving engagement with socket 16. Thus the invention provides a final assembly of nut, bolt and work wherein the nut is torqued during the driving operation while the driving tool enters the socket 16 and thereafter holds the bolt against rotation under the reaction of thread engagement with the rotating nut.

I claim:

1. A nut for use in cooperation with a bolt including a head and a shank, having a male thread of V-section; said nut including: a tubular intermediate body, a locking collar, and a work engaging flange, said collar and flange constituting respective end portions of the nut and being coaxial and integral with said body said tubular body and collar being tapered in axial cross-section with a continuing decrease in wall thickness from a maximum-thickness area of integral junction with said flange to a minimum wall thickness at the tip of said collar, said body and collar having an internal thread of V-section mating with said bolt thread and of uniform pitch and helical continuity including a normal portion in said body and a locking portion in said collar extending to the adjacent end of the nut, said locking portion being reduced in radius uniformly throughout its full circumference below the radius of said normal portion, by a reduction in the range of 1% to 4% of the radial depth of said nut thread, whereby said collar is adapted to be expanded smoothly within its elastic limit by passage of said threaded section of the bolt therethrough, thereby to grip the bolt by hoop tension so as to lock the nut securely to the bolt and to endure repeated separations and recouplings of the nut and bolt without loss of locking efficiency or damage to the threads thereof, said flange having a concave frusto-conical work engaging seat subtending an angle of between 0.5 degree and 3 degrees to a plane normal to the axis of the nut, said flange being proportioned and arranged with relation to said tubular body so as to have an average axial thickness substantially as great as its radial thickness, with said radial thickness being approximately twice the average radial thickness of said tubular body, and so as to have its inner wall located at approximately the same radius as the root of said internal thread, whereby said flange is distortable under the axial loading thereof against the work when the fastener is normally tightened, with a Belleville washer deflection, to a substantially flat condition in which said seat is in full contact with the work and in which the turns of said normal thread portion adjacent the work are expanded and said locking collar is contracted so as to shift the loading of said internal thread away from the work and thereby distribute the load between the several turns of said normal thread portion in accordance with elongation of said threaded section under load tension.

2. A nut for use in cooperation with a bolt including a head and a shank having a male thread of V-section; and said nut including a tubular intermediate body, a locking collar, and a work engaging flange, said collar and flange constituting respective end portions of the nut and being coaxial and integral with said body said tubular body being of substantially uniformly decreasing wall thickness from a maximum-thickness area of integral junction with said flange to a minimum thickness at the base of said collar, said collar being stepped down to a thickness substantially less than said minimum thickness of the tubular body, said body and collar having an internal thread of V-section mating with said bolt thread and of uniform pitch and helical continuity including a normal portion in said body and a locking portion in said collar extending to the adjacent end of the nut, said locking portion being reduced in radius uniformly throughout its full circumference below the radius of said normal portion with a reduction increasing uniformly along a conically spiraling path from the point of junction with said normal thread portion to the end of said locking thread, with the maximum reduction at the end of the nut and being no more than approximately 2.5% of the diameter of said nut thread, whereby said threaded section, in advancing through said locking collar, will expand the collar with a gradual expanding action of progressively increasing expansion, without galling and within the elastic limits of said collar, whereby the collar is made operative to grip the bolt by hoop tension so as to lock the nut securely to the bolt and to endure repeated separations nad recouplings of the nut and bolt without loss of locking efficiency or damage to the threads thereof, said flange having a frusto-conical concave work engaging seat subtending an angle of 1 to 2 degrees to a plane normal to the axis of the nut, said flange being proportioned and arranged with relation to said tubular body so as to have an average axial thickness substantially as great as its radial thickness, with said radial thickness being approximately twice the average radial thickness of said tubular body, and so as to have its inner wall located at approximately the same radius as the base of said internal thread, whereby said flange is distortable under the axial loading thereof against the work when the fastener is normally tightened, with a Belleville washer deflection, to a substantially flat condition in which said seat is in full contact with the work and in which the turns of said normal thread portion adjacent the work are expanded and said locking collar is contracted so as to shift the loading of said internal thread away from the work and thereby distribute the load between the several turns of said normal thread portion in accordance with elongation of said threaded section under load tension.

3. A nut for use in cooperation with a bolt including a head and a shank having a male thread of V-section; and said nut including a tubular intermediate body, a locking collar, and a work engaging flange, said collar and flange constituting respective end portions of the nut and being coaxial and integral with said body, said body and collar being of substantially constantly and slightly decreasing wall thickness from said flange to the tip of said collar, and having an internal thread of V-section mating with said bolt thread and of uniform pitch and helical continuity including a normal portion in said body and a locking portion in said collar extending to the adjacent end of the nut, said locking portion being reduced in radius below the radius of said normal portion with a reduction increasing uniformly along a conical spiral path from the point of junction with said normal thread portion to the end of said locking thread, with the maximum reduction at the end of the nut and being approximately 1% of the radius of said nut thread, whereby said threaded section, in advancing through said locking collar, will expand the collar with a gradual expanding action and progressively increasing expansion, without galling and within the elastic limits of said collar, whereby the collar is made operative to grip the bolt by hoop tension so as to lock the nut securely to the bolt and to endure repeated separations and recouplings of the nut and bolt without loss of locking efficiency or damage to the threads thereof, said flange having a circular rim and a concave frusto-conical work engaging seat intersecting said rim to define a circular edge for initial work engaging contact at the periphery of said seat, said seat subtending an angle of approximately 1 degree to a plane normal to the axis of the nut, said flange being proportioned and arranged with relation to said tubular body so as to have an average axial thickness substantially as great as its radial thickness, with said radial thickness being approximately twice the average radial thickness of said tubular body, and so as to have its inner wall located at approximately the same radius as the base of said internal thread, whereby said flange is distortable under the axial loading thereof against the work when the fastener is normally tightened, with a Belleville washer deflection, to a substantially flat condition in which said seat is in full contact with the work and in which the turns of said nut or thread portion adjacent the work are expanded and said locking collar is contracted so as to shift the loading of said internal thread away from the work and thereby distribute the load between the several turns of said normal thread portion in accordance with elongation of said threaded section under load tension.

4. A nut as defined in claim 1, said nut further including a series of flat wrenching faces defining the periphery of said tubular body in the form of a fulcrum of a regular pyramid, with said wrenching faces tapering unbrokenly inwardly at a slight angle toward the locking collar from said area of integral junction to the base of said locking collar, said locking collar having a frusto-conical peripheral surface offset inwardly substantially below the minimum outer end thickness of said tubular wall and tapering to slightly smaller external diameter at the tip of said collar.

5. A nut and bolt fastener comprising, in combination: a nut as defined in claim 1, and a bolt having a V-thread mating with said V-thread of the nut and cooperating therewith to effect said load distribution.

6. A fastener as defined in claim 1, wherein the angle of said work engaging seat is approximately 1 degree, and wherein the reduction in radius of said locking portion of the nut thread is in an optimum range between 1.75% and 2.5% reduction.

References Cited in the file of this patent

UNITED STATES PATENTS

| | | |
|---|---|---|
| 792,884 | Eicher | June 20, 1905 |
| 1,077,023 | Ward | Oct. 28, 1913 |
| 2,395,037 | Cole | Feb. 19, 1946 |
| 2,406,070 | Funk | Aug. 20, 1946 |
| 2,543,705 | Place | Feb. 27, 1951 |
| 2,546,332 | Costello | Mar. 27, 1951 |

FOREIGN PATENTS

| | | |
|---|---|---|
| 750,894 | Great Britain | June 20, 1956 |